Aug. 21, 1923.
W. H. MERCER
BANDAGE FASTENER
Filed Nov. 3, 1921
1,465,717
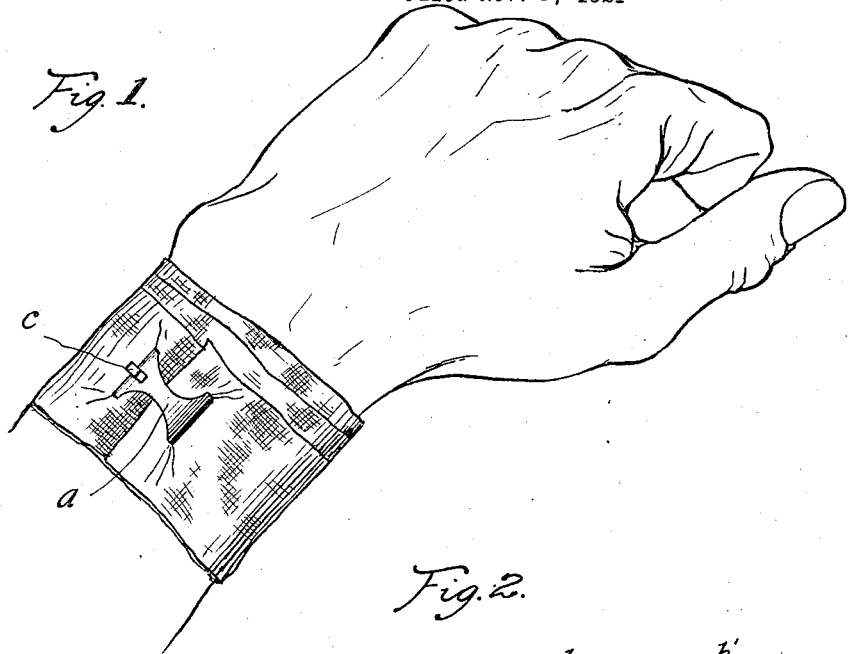
Fig. 1.
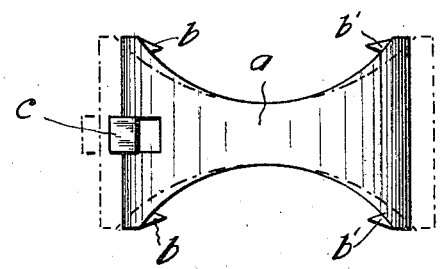
Fig. 2.
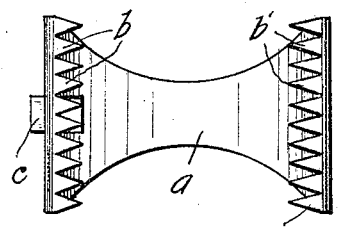
Fig. 3.
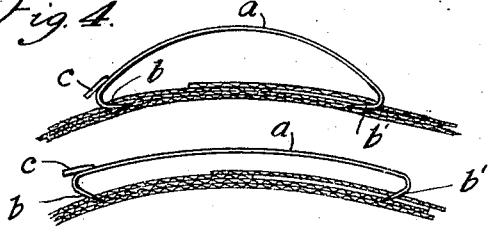
Fig. 4.
Fig. 5.
Inventor:
William H Mercer
by
Atty.

Patented Aug. 21, 1923.

1,465,717

UNITED STATES PATENT OFFICE.

WILLIAM H. MERCER, OF PORTLAND, OREGON.

BANDAGE FASTENER.

Application filed November 3, 1921. Serial No. 512,454.

*To all whom it may concern:*

Be it known that I, WILLIAM H. MERCER, a citizen of the United States, and a resident of the city of Portland, county of Multnomah and State of Oregon, have invented a certain new and useful Improvement in Bandage Fasteners, of which the following is a specification.

The object of my invention is to provide an inexpensive device for fastening the lapping end of a surgical bandage securely in place; and which furthermore is more easily applied, and is more efficient than either a safety pin or tape.

I attain my object in a fastener made of resilient material, and adapted normally to assume an arcuate curve and to be flattened by pressure. The opposite ends of the body are provided with inwardly extending flat fabric engaging projections, which, in the normal form of the body, are positioned to lie in the plane of the chord of said arcuate curve. But when my fastener is to be applied to a bandage and its body is flattened by pressure, said projections will be caused to assume an angular position with respect to said plane and extend below the latter, thereby being arranged so as to be capable of penetrating the bandage material. Then when the pressure is removed the reflex action of the body will cause said projections to engage with said fabric and thus secure the lapping bandage ends securely in place and at the same time move the extremities of said projections away from the inner face of the bandage so that they can not penetrate thru the bandage into the flesh.

The construction and operation of my bandage is illustrated in the accompanying drawings, in which:

Fig. 1 illustrates the practical use of my bandage fastener;

Fig. 2 is a top view of my bandage fastener when the same is in its normal shape, which is illustrated by the side elevation of Fig. 4; the dotted lines of Fig. 2 showing the bandage fastener being pressed into the position illustrated by Fig. 5, in which position the pin points provided at the ends of the fastener may penetrate the bandage material so as to secure the laps in place;

Fig. 3 is a bottom view of my fastener; and

Figs. 4 and 5, as already mentioned, illustrate the operation of my fastener.

It is to be noted that the illustrations of Figs. 2 to 5 are greatly exaggerated in dimensions.

My fastener comprises a body $a$ made of a resilient, flat piece of metal, and which may be shaped as shown, namely: the middle part of the body being reduced so as to give greater resiliency and flexibility to this portion, while at the same time retaining more or less rigidity at the ends of the fastener. The ends of the fastener are provided with a plurality of fabric engaging projections $b$ and $b'$, curved inwardly, and so arranged as normally to lie approximately in the chord of the arcuate curve of the body as illustrated in Fig. 4. When pressure is brought to bear on the middle of the body of the fastener the same becomes arranged as shown in Fig. 5, thereby throwing the fabric engaging projections $b$ and $b'$ into angular position relatively to the bandage; thus causing the fabric engaging projections to penetrate the bandage material and fasten the laps thereof together. When the finger is then removed the fastener will resume its initial position shown by Fig. 4 again placing its fabric engaging projections in their initial position, in which they become arranged parallel with the surface encompassed by the bandage, and hence are incapable of penetrating thru the bandage into the flesh. When the bandage is to be removed the body of my fastener is first depressed as shown in Fig. 5 and then one end of the bandage is first disengaged. It will be found that the bandage may be readily applied and as readily removed.

The fabric engaging projections $b$ and $b'$ are preferably made in the form of serrations thereby tending to limit the penetration of these projections into the bandage material and thus facilitating the removal of my fastener. In other words, the bandage material will tend to pull off the serrations when my fastener is depressed so as to be flat, as done when the fastener is to be removed. At the same time the engagement of said projections with the bandage material will be ample to securely fasten the bandage in place.

In order to facilitate the removal from the bandage, one end of my fastener may be provided with a finger piece or lip $c$. Such construction, however, is optional.

It will be apparent that my bandage may be inexpensively stamped out of a sheet of metal, and readily formed to the shape desired.

I claim:

1. A bandage fastener comprising a body made of resilient material, reduced in width at its middle to increase its flexibility and adapted, normally, to assume an arcuate curve and to be flattened by pressure; the opposite ends of the body being provided with flat, inwardly extending fabric engaging projections which, in the normal form of the body, are positioned to lie in the plane of a chord of said arcuate curve; whereby when the body is flattened by pressure said projections will be positioned at an angle to, and project below said plane for engagement with the bandage material, and when said pressure is removed the reflex action of the body will cause said projections to engage with said fabric, at the same time moving the extremities of said projections away from the inner face of the bandage, and rendering it incapable of penetrating the latter.

2. A bandage fastener comprising a body made of resilient material, and adapted, normally, to assume an arcuate curve and to be flattened by pressure; the opposite ends of the body being provided with flat, inwardly extending serrations which, in the normal form of the body, are positioned to lie in the plane of a chord of said arcuate curve; whereby when the body is flattened by pressure said serrations will be positioned at an angle to, and project below said plane for engagement with the bandage material, and when said pressure is removed the reflex action of the body will cause said projections to engage with said fabric, at the same time moving the extremities of said serrations away from the inner face of the bandage, and rendering it incapable of penetrating the latter.

3. A bandage fastener comprising a body made of resilient material and adapted, normally, to assume an arcuate curve and to be flattened by pressure; the opposite ends of the body being provided with flat, inwardly extending fabric engaging projections which, in the normal form of the body, are positioned to lie in the plane of a chord of said arcuate curve; whereby when the body is flattened by pressure said projections will be positioned at an angle to, and project below said plane for engagement with the bandage material, and when said pressure is removed the reflex action of the body will cause said projections to engage with said fabric, at the same time moving the extremities of said projections away from the inner face of the bandage, and rendering it incapable of penetrating the latter.

4. A bandage fastener comprising a body made of resilient material, reduced in width at its middle to increase its flexibility and adapted, normally, to assume an arcuate curve and to be flattened by pressure; the opposite ends of the body being provided with flat, inwardly extending serrations which, in the normal form of the body, are positioned to lie in the plane of a chord of said arcuate curve; whereby when the body is flattened by pressure said serrations will be positioned at an angle to, and project below said plane for engagement with the bandage material, and when said pressure is removed the reflex action of the body will cause said projections to engage with said fabric, at the same time moving the extremities of said serrations away from the inner face of the bandage, and rendering it incapable of penetrating the latter.

WILLIAM H. MERCER.